(12) United States Patent
Craun et al.

(10) Patent No.: US 6,242,531 B1
(45) Date of Patent: Jun. 5, 2001

(54) ACRYLIC AQUEOUS MINIEMULSION COPOLYMER THICKENERS AND LATEX PAINTS CONTAINING SAID THICKENERS

(75) Inventors: Gary P. Craun, Berea; Kenneth G. Hahn, Hinckley, both of OH (US)

(73) Assignee: The Glidden Company, Cleveland, OH (US)

( * ) Notice: Subject to any disclaimer, the term of this patent is extended or adjusted under 35 U.S.C. 154(b) by 0 days.

(21) Appl. No.: 09/233,221

(22) Filed: Jan. 19, 1999

(51) Int. Cl.$^7$ ....................................... C08L 31/00
(52) U.S. Cl. ..................... 524/833; 524/832; 525/329.9
(58) Field of Search ................... 524/832, 833; 525/329.9

(56) References Cited

U.S. PATENT DOCUMENTS 4,351,754 * 9/1982 Dupre ..................................... 524/445
5,405,900 * 4/1995 Jenkins et al. ........................ 524/556

FOREIGN PATENT DOCUMENTS 0 705 852 * 4/1996 (EP) .

* cited by examiner

*Primary Examiner*—Helen L. Pezzuto
(74) *Attorney, Agent, or Firm*—Thomas M. Schmitz

(57) ABSTRACT

The invention pertains to an aqueous acrylic copolymer thickener particularly useful for thickening latex paints, the thickener copolymer comprising aqueous copolymerized ethylenically unsaturated monomers comprising between 10% and 90% carboxyl functional monomer, between 1% and 50% long alkyl ester of acrylate or methacrylate, and preferably between 20% and 90% methyl or ethyl acrylate or methacrylate. The mixture of monomers is mixed with water and surfactant, micronized to droplet size less than 5 microns, copolymerized to form a carboxyl functional copolymer, which is then neutralized with amine to form a thickener copolymer.

12 Claims, No Drawings

ACRYLIC AQUEOUS MINIEMULSION COPOLYMER THICKENERS AND LATEX PAINTS CONTAINING SAID THICKENERS

This invention pertains to aqueous dispersed high molecular weight thickeners, and particularly to aqueous acrylic miniemulsion copolymers produced directly in a water medium and especially useful as thickeners in air dry latex paints.

BACKGROUND OF THE INVENTION

Thickeners are used in numerous products for Theological control purposes and particularly for increasing viscosity and imparting thixotropic properties to the products. Thickeners for water dispersed compositions require compatibility and stability, especially in latex paints. Paint coatings are surface coatings applied to substrates and dried to form continuous films for decorative purposes as well as to protect the substrate. Consumer paint coatings are air-drying and primarily decorative architectural coatings applied to interior or exterior surfaces, where the coatings are sufficiently fluid to flow out and form a continuous paint film, and then dry at ambient temperatures. Industrial maintenance coatings are similar coatings applied to substrates in industrial environments to primarily protect the substrate.

A paint coating ordinarily comprises an organic polymeric binder, pigments, and various paint additives. In dried paint films, the polymeric binder functions as a binder for the pigments and provides adhesion of the dried paint film to the substrate. The pigments may be organic or inorganic and functionally contribute to opacity and color in addition to durability and hardness of the dried paint film, although some paint coatings contain little or no opacifying pigments and can be described as clear or opaque coatings. The manufacture of paint coatings involves the preparation of polymeric binder, mixing of component materials, grinding of pigments in a dispersant medium, the addition of thickeners for rheology control, and thinning to commercial standards.

Latex paints for consumer and industrial maintenance markets typically are based on polymeric binders prepared by emulsion polymerization of ethylenic monomers. A typical latex paint binder, for instance, contains vinyl acetate copolymer consisting of major amounts of polymerized vinyl acetate copolymerized with lesser amounts of acrylate monomer such as butyl acrylate. Other polymeric binders are primarily or entirely acrylic copolymer latex emulsions. The hardness of the latex polymer must be balanced to permit drying and film formation at ambient application temperatures, which requires soft polymer units, while at the same time being hard enough to provide dried film resistance properties, which requires hard polymer units. This is conventionally accomplished by designing a latex polymer with a moderately elevated Tg (glass transition temperature) but then lowering the Tg temporarily with a volatile organic coalescing solvent. Coalescing solvents function to temporarily plasticize the latex polymer for time sufficient for the polymer particles to coalesce and develop film formation.

Due to the continuous aqueous phase in latex polymers, latex paints must contain dispersants and thickeners to promote adequate suspension of the pigment along with proper application rheology and flow out. The paint viscosity during storage must be adequately high to prevent settling, but readily reduced by applied shear to spread and flow out evenly. Latex paint typically exhibits thixotropic rheology to enable the paint to be applied readily by brush or roller or spray application. On a vertical wall, thixotropy will enable the applied paint to flow into a smooth continuous paint film without sagging.

For many years, the thickeners of choice for latex paints were derivatives of cellulose, including carboxymethyl cellulose and hydroxy ethyl cellulose. Other thickeners commonly used are polyethylene oxide copolymers commonly known as "Tween" or "Carbowax" thickeners, but these thickeners cause water sensitivity to the dried paint film due to the polyethlene oxide molecular structure. In recent years, the polyoxide thickeners have been largely replaced by associative thickeners, including hydrophobically modified hydroxyethyl cellulose and hydrophobically modified polyethylene glycols with the terminal hydrophobes attached by urethane linkages (HEUR). Other thickeners are acrylic polymers modified with inert non-reactive hydrocarbyl terminated compound such as shown in U.S. Pat. No. 5,292,828, EP 705,852, WO 9324544, and U.S. Pat. No. 5,405,900 with hydrophobic modification. All of these thickeners provide acceptable application properties, including roller spatter resistance and good flow and leveling, but are high cost materials and cause considerable water sensitivity in the dry paint film.

It now has been found that high molecular weight polymeric thickeners for water dispersed products generally, and especially useful for thickening aqueous emulsion latex paints, can be produced directly in water without utilizing volatile organic solvent or hydrocarbon diluents by copolymerizing an aqueous miniemulsion of ethylenic monomers in water to directly produce a miniemulsion polymeric thickener. In latex paints, the miniemulsion copolymer functions as a thickener for rheological control purposes as well as an effective dispersant for pigment dispersion into the latex polymeric binder. In accordance with this invention, the high molecular weight thickener is produced by first mixing together a mixture of specific ethylenic unsaturated monomers including acrylic or methacrylic acid monomer, a long chain alkyl methacrylate or acrylate, along with a methyl or ethyl ester of acrylic or methacrylic acid. The mixture of monomers is first blended together, mixed with surfactant and water, and then microdispersed into water under high shear to produce a water dispersed miniemulsion of ethylenic monomers. The preformed miniemulsion of organic monomers is then copolymerized to produce an aqueous miniemulsion copolymer having a particle size below 5 microns and preferably between 0.1 and 1.0 microns. Forming an aqueous miniemulsion of monomers prior to copolymerization enables formation of high molecular weight polymeric thickener in water directly and without the assistance of organic solvents. The preformed miniemulsion insures uniform monomer composition during aqueous polymerization and avoids the partitioning of the long chain alkyl acrylate and methcarylate ester monomers into large droplets.

In conventional latex polymerization, monomer added directly to a mixture of surfactant and water ordinarily forms monomer droplets usually several hundred microns in diameter. Monomers then diffuse into the aqueous phase and polymerize in tiny polymer particles, which are less than 1 micron in diameter. However, conventional latex polymerization will not work with the mixture of monomers described above, because the long chain alkyl acrylate and methacrylate esters are not water soluble enough to diffuse from the large monomer droplets into the polymer particles. Ordinarily the long chain alkyl acrylate and methacrylate ester monomers become separated and fail to copoplymerize with carboxyl monomers and lower alkyl ester and similar monomers. Consequently, the long chain alkyl ester monomers remain unreacted in the large monomer droplets, while the other monomers copolymerize without them in the polymer particles. Miniemulsion polymerization in accordance with this invention circumvents this problem by pre-emulsifying the monomer mixture (including the long chain alkyl ester monomers) to a sub-micron particle size. These preformed miniemulsions are stabilized by the water insoluable long chain alkyl ester monomers. Polymerizaton then takes place in these uniform monomer sub-micron droplets to give a uniform polymer composition which includes copolymerized long chain alkyl ester monomers.

Acrylic polymeric surfactants and thickeners in organic solvent have been disclosed in several patents. For example, U.S. Pat. No. 4,509,949 teaches polymeric thickeners with compositions of about 96% acrylic acid, 3% stearyl methacrylate, and 1% allyl crosslinker. However, the solvent must be removed from the polymer prior to use in a process that is difficult and expensive. Similarly, U.S. Pat. No. 5,288,814 suggests comparable acrylic thickeners prepared in solvent with a steric stabilizer to aid in processing. U.S. Pat. No. 5,057,241 and 4,351,754 suggest an acrylic thickener that has a composition of about 40% methacrylic acid, 50% ethyl acrylate, and 10% of a acrylate or methacrylate monomer, where the monomer contains a polyethylene glycol block of about 10 to 20 units and a terminal alkyl group of about 15 to 20 carbons. The polyethylene oxide structure however causes high water sensitivity to paint films. EP 0707 110 Al describes an acrylic emulsifier prepared by conventional latex polymerization from about 60% acrylic acid, 10% stearyl methacrylate, 30% butyl acrylate, and a chain transfer agent in water with a sulfate surfactant. The resulting emulsion, however, does not have uniform polymer composition and exhibits inferior properties due to being prepared by a normal latex process. The long chain alkyl monomer, stearyl methacrylate together with acrylic acid and butyl acrylate, is fed into a mixture of water and surfactant without pre-emulsification. The acrylic acid and butyl acrylate, being partially water soluble, migrate through the aqueous phase to the polymer particles leaving the water insoluble stearyl methacrylate behind in large monomer droplets. Polymer formed in the polymer particles is a copolymer of butyl acrylate and acrylic acid while stearyl methacrylate is left to homopolymerize or remain unreacted.

In contrast, the process and the polymers prepared in accordance with this invention provide useful polymeric thickeners of a uniform polymeric particle composition and free of organic solvents or diluents. Miniemulsion copolymers prepared by this invention provide excellent polymeric thickeners for various water dispersed products, especially in the formation of emulsion polymers for latex paints. By using a carboxyl monomer and long alkyl chain acrylate or methacrylate hydrophobic monomers, along with other monomers, the resulting miniemulsion polymeric thickeners minimize water sensitivity problems and increase thickening properties considerably to enable reduction in the amounts of thickener and paint solids required to maintain the desired paint viscosity. High opacity contrast ratios are maintained while shim scrub resistance is improved. The miniemulsion copolymer thickeners provide excellent viscosity build in latex paints and further provide a dispersant for pigments. These and other advantages of this invention will become more apparent by referring to the detailed description and the illustrative examples.

SUMMARY OF THE INVENTION

Briefly, the invention is directed to aqueous dispersed polymeric thickeners generally, and especially miniemulsion copolymeric thickeners particularly useful for latex paints. The polymeric thickener is a very high molecular weight, aqueous miniemulsion copolymer of copolymerized ethylenically unsaturated monomers comprising by weight between 10% and 90% carboxyl functional monomer, between 1% and 50% long alkyl chain ester of acrylate or methacrylate monomer, preferably including between 20% and 90% methyl or ethyl acrylate or methacrylate, with the balance being other ethylenic monomers. The process comprises premixing the monomers in the absence of solvent, mixing the monomers with water and surfactant to form a macroemulsion, microninzing the aqueous macroemulsion to form an aqueous uniform miniemulsion of monomers, and copolymerizing the miniemulsion of monomers to form a carboxyl functional miniemulsion copolymer having a uniform polymeric composition particle preferably less than five microns, and preferably less than about one micron in size. The aqueous miniemulsion copolymer is useful as a thickener generally for water dispersed compositions, and especially useful for latex paints.

DETAILED DESCRIPTION OF THE INVENTION

The miniemulsion polymeric thickener of this invention comprises an aqueous miniemulsion of copolymerized ethylenic monomers in the absence of non-reactive organic solvent or diluent, where the ethylenically unsaturated monomers include carboxyl monomers, long chain alkyl acrylate or methacrylate monomers, methyl or ethyl acrylate or methacrylate, with the balance being other ethylenic monomers.

Useful carboxyl monomers are carboxyl functional ethylenically unsaturated monomers including acrylic, methacrylic, ethacrylic, and similar lower alkyl substituted acrylic acids including acrylic acid and methacrylic acid where methacrylic acid is preferred. Other useful acids include maleic and fumaric acid as well.

Referring next to the long alkyl chain acrylate or methacrylate monomers, particularly useful monomers are hydrophobic and comprise an acrylic or methacrylic acid ester of an aliphatic alkyl chain having from 11 to 22 or higher carbon atoms including lauryl acrylate or methacrylate, tetradecyl acrylate or methacrylate, cetyl acrylate or methacrylate, and stearyl acrylate or methacrylate, as well as myristyl, decyl, palmitic, oleic, hydroxyldecyl, and similar long chain aliphatic acrylates or methacrylates.

In a preferred aspect of this invention, the monomer mixture includes between 20% and 90% of short chain acrylate or methacrylate selected from methyl acrylate or ethyl acrylate, or methyl methacrylate, or ethyl methacrylate, where ethyl acrylate is preferred. These short chain lower alkyl esters cause the polymeric thickeners of this invention to be more hydrophilic, thus increasing their ability to thicken without causing undo water sensitivity in the final paint film.

Other ethylenically unsaturated monomers which can be mixed with the above described monomers, include polymerizable ethylenically unsaturated monomers containing carbon-to-carbon unsaturation and include vinyl monomers, acrylic monomers, allylic monomers, and acrylamide monomers. Vinyl esters include vinyl acetate, vinyl propionate, vinyl butyrates, vinyl benzoates, vinyl isopropyl acetates and similar vinyl esters; vinyl halides include vinyl chloride, vinyl fluoride and vinylidene chloride; vinyl aromatic hydrocarbons include styrene, methyl styrenes and similar lower alkyl styrenes, chlorostyrene, vinyl toluene, and vinyl naphthalene; vinyl aliphatic hydrocarbon monomers include alpha olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclohexane, cyclopentadiene, and dicyclopentadiene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion other than methyl or ethyl containing between 3 to 10 carbon atoms as well as aromatic derivatives of acrylic and methacrylic acid. Useful acrylic monomers include, for example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as hydroxyethyl and hydroxy propyl acrylates and methacrylates, and amino acrylates and methacrylates.

In a preferred aspect of this invention, up to 5% but preferably between 1 ppm and 1% by weight of the ethylenic monomers copolymerized can comprise a divinyl crosslinking monomer. Useful divinyl monomers include divinyl benzene, hexanedioldiacrylate, diallyl phthlate, and allyl esters of pentaerythritol.

In accordance with this invention, the miniemulsion copolymer comprises polymerized ethylenically unsaturated monomers on a weight basis between 10% and 90% carboxyl functional monomer, between 1% and 50% long alkyl chain ester acrylate or methacrylate monomer, between 0% and 90% short alkyl chain acrylate selected from methyl or ethyl acrylate or methacrylate, with the balance being other ethylenically unsaturated monomers, where the total monomers polymerized is 100%. Preferred compositions contain between 20% and 90% ethyl or methyl acrylate. The number average molecular weight is above 100,000, preferably above 1,000,000, as measured by GPC. The miniemulsion is preferably lightly crosslinked with up to 5%, preferably less than 1%, divinyl monomer thus making the exact measurement of molecular weight difficult. The miniemulsion thickener copolymer comprises polymer particles less than 5 microns and preferably less than 1 micron.

In accordance with this invention, the ethylenically unsaturated monomers are blended together and emulsified by mixing into water with the aid of surfactants, such as the sulfates and sulfosuccinates, but in the absence of volatile organic solvent and organic diluents, to form a macroemulsion of monomer in water. A preferred surfactant is sodium dioctylsulfosuccinate. Organic solvents and diluents advantageously are not necessary and preferably are excluded, but small amounts of certain low molecular weight cosurfactants, such as n-hexanol can be added if desired. The aqueous macroemulsion of monomers in water is then micronized under high shear in a mechanical emulsifier, such as a Ross or IKA emulsifier, or a Sonolator ultrasound device, to produce an aqueous organic miniemulsion having organic droplets with particle size less than five microns, and preferably less than about one micron. The resulting aqueous miniemulsion of ethylenic monomers can contain up to about 90% by weight water. The monomers are then copolymerized at temperatures preferably between about 20 to 100° C. in the presence of a persulfate or peroxide initiator to form a miniemulsion copolymer having dispersed micropolymer particles less than 5 microns and preferably between 0.1 and 1.0 micron. Typical peroxide initiators include hydrogen peroxide, t-butyl hydroperoxide, Di-t-butyl peroxide, benzoyl peroxide, benzoyl hydroperoxide, 2,4-dichlorobenzoyl peroxide, t-butyl peracetate, while useful persulfates include ammonium persulfate, sodium persulfate, potassium persulfate, sodium perphosphate, and potassium or sodium persulfate or perphosphate, and redox initiators such as sodium persulfate-sodium formaldehyde sulfoxylate, cumene hydroperoxide-sodium metabisulfite, potassium persulfate-sodium bisulfite, and cumene hydroperoxide-iron (II) sulfate. Initiators ordinarily are added at levels between 0.1% and 5% based on the weight of ethylenic monomers copolymerized.

The resulting miniemulsion carboxyl functional copolymer is then neutralized with base and can be diluted with additional water if desired to form a diluted aqueous miniemulsion of micropolymer containing by weight preferably between 50% and 99% water. The carboxyl functionality can be neutralized with ammonia, or ammonium hydroxide, or amine, or mixtures thereof, where ammonia hydroxide is preferred. Useful amines include monoethanol amine, dimethyl ethanol amine, diethanol amine, triethyl amine, dimethylaniline, and similar primary, secondary and tertiary amines. Neutralization of about 50% to 100% of the carboxyl functionality is desired, while above 60% is preferred, and 100% is most preferred. Brookfield viscosities of the neutralized miniemulsion copolymer at 100% neutralization with ammonia at 2% polymer solids in water should be above about 100 cps, desirably above 1,000 cps, and preferably between 2,000 cps and 20,000 cps. The resulting neutralized miniemulsion of micropolymer particles can be used as a thickener for various water dispersed products and are especially useful as a thickener and pigment dispersant for latex paints.

Suitable film-forming latex binders typically include for instance vinyl and vinylidene polymers containing units such as vinyl acetate, vinyl chloride, vinylidene chloride, and the like; hydrocarbon polymers and copolymers containing ethylene or proplene units and oxygenated or halogenated derivatives of ether, butadiene, oxygenated butadiene, isoprene, oxygenated isoprene, butadiene-styrene, butadiene vinyl toluene, isoprene-styrene and the like; acrylic polymer and copolymers containing units of acrylic acid, methacrylic acid, their esters, and acrylonitrile; vinylic hydrocarbon monomers reacted with unsaturated materials such as the reaction product of maleic acid with styrene; and, broadly, various other resinous rubber-like elastomeric latex polymers and copolymers of ethylenically unsaturated monomers and are polymers obtainable in stable aqueous latex form. Such latex polymers are capable of coalescing into a pigmented film-forming binder when brushed, sprayed, or rolled onto a surface and air dried at ambient outdoor temperatures.

To produce the film-forming emulsion polymer, the ethylenically unsaturated monomers are copolymerized in an aqueous polymerization medium by adding the ethylenic monomers to water along with surfactants and polymerizing catalysts or initiators as well as other emulsion polymerization ingredients. Initiators can include for example, typical free radical and redox types such as hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, ammonium persulfate, sodium persulfate, potassium persulfate, sodium perphosphate, potassium perphosphate, isoproply peroxycarbonate, and redox initiators such as sodium persulfate-sodium formaldehyde sulfoxylate, cumene hydroperoxide-sodium metabisulfite, potassium persulfate-sodium bisulfite, cumene hydroperoxide-iron (II) sulfate, etc. The polymerization initiators are usually added in amounts between about 0.1 to 2 weight percent based on the monomer additions. Suitable anionic surfactants include, for example, sodium and potassium salts of fatty acids. Preferred anionic surfactants include alkylbenzene sulfonate salts such as sodium dodecylbenzene sulfonate and salts of hexyl, octyl, and higher alkyl diesters of 2-sulfosuccinic acid, etc. Suitable non-ionic surfactants include polyoxyethylene glycols reacted to a lyophilic compound to produce a hydrophile-lipophile balance preferably between about 10 and 15. Non-ionic surfactants include for example, ethylene oxide condensation products reacted with t-octylphenol or nonylphenol and known as "Triton" surfactants, polymerized oxyethylene (IgepalCA), ethylene oxide reacted with organic acid (Emulfor), or organic acid reacted with polyoxyamylene ether of stearic or oleic acid esters (Tweens). Certain alcohols and glycol ethers like hexanol or butyl cellosolve and the like can function as effective cosurfactants. They can be added at levels of about 0.1 to 2% with about the same level of an anionic or a non-ionic surfactant.

Film-forming emulsion polymers useful as film-forming binders ordinarily are used with coalescing agents to assist the polymer particles to coalesce into a continuous film. Suitable coalescing agents include diethylene glycol monobutyl ether acetate, diethlene glycol monoethyl ether acetate, ethylene glycol monophenyl ether, or 2,2,4-trimethyl-1, 3-pentanediol monoisobutyrate, which are helpful in modifying the properties of the film-forming latex binders to obtain desired coalescence of the film-forming polymer particles at the ambient coalescing temperature.

The manufacture of paint coatings involves the preparation of the polymeric binder, mixing of component materials including the micropolymeric thickener of this invention, and dispersing of pigments. High speed dispersers or dissolvers are typically used in the dispersing step to intersperse the pigments into a liquid phase. The binder and pigment dispersion can be thoroughly and uniformly mixed with raw batch ingredients by homogenizing the binders, pigmentary solids, plasticizers, micropolymeric thickener of this invention, and other components to form a uniform blend. Pigments ordinarily include opacifying pigments, such as titanium dioxide and zinc oxide, as well as tinting pigments such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, wollastonite, wood flower and the like can be added as desired.

In accordance with this invention, the miniemulsion copolymer thickener ordinarily is added to latex polymeric binder at a level of 0.5% to 10%, and preferably between 1% and 4%, based on the weight of liquid paint solids. The level of thickener is determined by the rhelogical properties desired in the paint.

The following examples further illustrate the merits of this invention.

EXAMPLES

An aqueous miniemulsion copolymer useful as a polymeric thickener was produced by the following process generally. The monomers are blended and emulsified into water with the aid of anionic surfactants such as the sulfates and the sulfosuccinates. A very useful surfactant is a medium chain alcohol such as n-hexanol used with Na dioctylsulfosuccinate. Emulsification is done under high shear, such as in an emulsifier (Ross or IKA emulsifiers) or with ultrasound (Sonolator). Particle sizes of less than one micron are typically generated during high shear micro emulsification. Polymerization of the emulsified monomers can be initiated with persulfates, peroxides, and other common free radical initiators at temperatures of about 20 to 1 OOC with aqueous miniemulsion at concentrations of up to about 50% by weight. After polymerization the emulsions are diluted and neutralized to provide thickening and water solubility. Brookfield viscosities at 100% neutralization with NH3 range up to 1,000 cps or higher at 2% solids. Neutralized products can be used as emulsifier thickeners for various products, and are especially useful for latex paints.

Example 1

An acrylic polymeric thickener was produced in accordance with this invention from the following raw materials.

|    | Weight | Raw Materials |
| --- | --- | --- |
| a) | 200 g | water |
|    | 2.5 g | Aerosol OT-75 surfactant |
| b) | 25 g | stearyl methacrylate |
|    | 75 g | methacrylic acid |
|    | 150 g | ethyl acrylate |
|    | 1.0 g | n-hexanol |
| c) | 530 g | water |

Components (a) and (b) were mixed together and emulsifyed on a Ross ME-100 emulsifier for 5 minutes at maximum speed. Component (c) was added at low speed and the miniemulsion was purged in a 2 liter Morton flask 1 hour at 70 C. After, 1.3 g ammonium persulfate was added in 15 g water to initiate polymerization. The mixture was held at 70° for 3 hours and then cooled to room temperature.

The miniemulsion copolymer was fully neutralized by placing 100 g of the microemulsion in a flask and adding 5.5 g NH3 (28%) in 1144 g water. Viscosity was 6,560 cps Brookfield spindle No.3 at 10 rpm.

Example 2

An acrylic polymeric surfactant was prepared as in Example 1, but ethyl acrylate was replaced with butyl acrylate. Neutralization at 2.5% by weight solids gave 43,000 cps Brookfield viscosity at 1rpm.

Example 3

Preparation of a thickener by a conventional latex process for comparison purposes.

|    |      |                      |
| --- | --- | --- |
| a) | 0.6 | n-hexanol |
|    | 18.4 | stearyl methacrylate |
|    | 48.8 | methacrylic acid |
|    | 82.4 | ethyl acrylate |
| b) | 423 | water |
|    | 3.0 | OT-75 surfactant |
| c) | 0.8 | ammonium persulfate |
|    | 16 | water |

Heat b) to 75 C in a Morton flask, and purge with N2. Add 20 grams of (a), then add (c). Hold 30 minutes, then feed in the rest of (a) over 3 hours. Hold 1 hour and cool. The thickener in this Example 3 was prepared by a normal latex process. The monomer mixture was not pre-emulsified as in Examples 1 and 2 and 4 through 7. Comparative results, as seen in Example 11, confirm that this latex process gives clearly inferior results as compared to the miniemulsion processed in accordance with invention.

Examples 4–7

Preparation of thickeners with a range of monomer compositions were made according to the process of this invention as follows.

|   |   | Ex 4 | Ex 5 | Ex 6 | Ex 7 |
|---|---|---|---|---|---|
| a) | water | 225 | 225 | 225 | 225 |
| b) | water | 198 | 198 | 198 | 198 |
|   | OT-75 | 3.0 | 3.0 | 3.0 | 3.0 |
|   | n-hexanol | 0.6 | 0.6 | 0.6 | 06. |
|   | stearyl methacrylate | 18.4 | — | 18.4 | 18.4 |
|   | lauryl methacrylate | — | 18.4 | — | — |
|   | methyl acrylate | — | — | 62.4 | — |
|   | butyl acrylate | — | — | 20 | — |
|   | ethyl acrylate | 82.4 | 82.4 | — | 82.4 |
|   | methacrylic acid | 48.8 | 48.8 | 48.8 | 48.8 |
|   | divinyl benzene | 0.06 | — | — | — |

Warm (a) to 75 C in a Morton flask with a N2 purge. Emulsify (b) 5 minutes on a Ross ME-100 emulsifier at maximum speed. Add 35 g of the emulsion to the flask, then 0.8 g ammonium persulfate in 16 g water. Hold 30 minutes, and then feed in the rest of (b) over 1.5 hours. Hold 1 hour and cool.

The experimental paints in the following examples demonstrate the utility of the miniemulsion terpolymers as pigment dispersants and as paint thickeners.

Example 8

A standard good quality flat paint was prepared by standard paint-making methodology, and was compared with one made using the same procedure and components, except that in the second example (Ex.9) the oligomeric pigment dispersant and a significant part of the thickener was replaced by the miniemulsion terpolymer. In a typical process, water, dispersants, thickeners, surfactants, defoamers and additives are charged to a high-speed dispersion mixer. Enough water is used to provide a viscosity which will give adequate shear to disperse the pigments. Pigments are added with good mixing and exposed to high shear for several minutes until a good dispersion is achieved. Following this, latex binder, thickeners, defoamers and coalescing solvent are added, along with enough water to achieve the desired paint viscosity for proper application. The paints in this Example 8, in accordance with this invention, contain the following materials:

|   | Good Quality Commercial Flat Paint | Good Quality Experimental Flat Paint |
|---|---|---|
| Water | 380 | 387.7 |
| Natrosol Plus 330 | 1.75 | 0.75 |
| 28% ammonia water | 0.50 | 2.50 |
| Bactericide | 1.50 | 1.50 |
| Sodium salt of polymeric carboxylic acid | 8.0 | 0.0 |
| Miniemulsion terpolymer of Ex. 7 | 0.0 | 8.0 |
| Disodium Phosphate | 2.0 | 2.0 |
| Nonylphenol ethoxylate surfactant | 3.0 | 3.0 |
| Defoamers | 6.0 | 4.5 |
| Calcined Kaolin | 182.3 | 182.3 |
| Magnesium silicate | 133.6 | 133.6 |
| Magnesium Aluminum Silicate | 4.0 | 4.0 |
| Rutile Titanium Dioxide | 168.0 | 168.0 |
| HEUR Thickeners | 24.0 | 6.0 |
| Propylene glycol | 10.0 | 10.0 |
| Coalescing solvent | 10.0 | 10.0 |
| PVA latex | 203.9 | 203.9 |

Liquid paint specifications and performance are as follows.

| Volume solids | 32.4% | 32.4% |
|---|---|---|
| Pigment volume concentration | 56.7% | 56.7% |
| Viscosity (KU) | 107 | 90 |

The viscosity of the experimental paint of this invention is lower but within the acceptable commercial range and has a useful pleasant consistency. Physical properties on dried 3-mil films are as follows.

| Contrast ratio | 0.9770 | 0.9770 |
|---|---|---|
| Roller applications to 12 Sq. Ft. (Grams | 120 | 116 |
| Flow and levelling | Fair | Fair |
| Shim scrubs | Standard | 120% of standard |

Example 9

Following the procedure in Example 8 above, acceptable fair quality flat paints were made as follows.

|   | Commercial Flat Paint | Experimental Flat Paint |
|---|---|---|
| Water | 615 | 607 |
| Natrosol Plus 330 | 8.80 | 3.90 |
| 28% ammonia water | 1.55 | 2.55 |
| Bactericide | 1.50 | 1.50 |
| Sodium salt of polymeric carboxylic acid | 4.50 | 0.00 |
| Miniemulsion terpolymer of Ex. 7 | 0.00 | 8.00 |
| Disodium Phosphate | 1.50 | 1.50 |
| Nonylphenol ethoxylate surfactant | 3.00 | 3.00 |
| Defoamers | 5.00 | 4.00 |
| Calcined Kaolin | 155.0 | 155.0 |
| Magnesium silicate | 85.1 | 85.1 |
| Magnesium Aluminum Silicate | 5.00 | 5.00 |
| Rutile Titanium Dioxide | 53.5 | 53.5 |
| Coalescing solvent | 5.5 | 5.5 |
| PVA latex | 90.0 | 97.4 |
| Volume solids | 20.0% | 20.0% |
| Pigment volume concentration | 63.7% | 63.7% |
| Viscosity (KU) | 101 | 95 |

The viscosity of the experimental paint is lower but within the commercial range and has a useful pleasant consistency.

|                                      | Commercial Flat Paint | Experimental Flat Paint |
|--------------------------------------|----------------------|------------------------|
| Contrast ratio                       | 0.9590               | 0.9590                 |
| Roller application to 12 Sq. Ft. (Grams) | 100              | 110                    |
| Flow and levelling                   | Fair                 | Fair                   |
| Shim scrubs                          | Standard             | 150% of Standard       |

After one week at 140° F. storage, the viscosity of both experimental paints was essentially stable, which was surprising and unusual for base thickened rheology modifiers. This was equivalent to the stability of the commercial standard paints in the examples.

Example 10

In another example of the utility of the miniemulsion terpolymer as paint thickener, a similar paint composition was made, at about 140 KU. Different amounts of water were added to samples of the paint to demonstrate how the unusual rheology would permit reduction with high levels of water, compared with conventional latex paints.

Professional painters often dilute paint at the job site to maximize its utilization, but conventional paints become too thin to use when as little as 10% extra water is added. In that state the reduced paint will not apply well by brush or roller, and tends to sag and run down the wall if applied by spray. If left in the can unstirred, a conventional paint will exhibit heavy settling within 1-2 hours. Water dilutions of 15 or 20% of conventional latex paints produce unuseful paints.

In contrast, latex paints made with the thickener of this invention can be diluted with water considerably and still produce a useful latex paint.

| Paint/water ratio | 5/1 | 5/2 | 5/3 | 5/4 | 5/5 |
|-------------------|-----|-----|-----|-----|-----|
| Viscosity (KU)    | 86  | 63  | 54  | <53 | <53 |
| Viscosity (ICI)   | 0.62| 0.42| 0.32| 0.24| 0.20|
| In-can settling overnight | None | None | None | None | None |
| Thickness before sagging on sealed Leneta paper | >12 mils | >12 mils | >12 mils | 9 mils | 6–7 mils |

Brush application is good, even at 5/4 reduction, which demonstrates that the paint of this invention can be adjusted as desired at the application site to levels much beyond those of conventional paints.

Example 11

Paints were prepared with thickeners in Examples 3 through 7 as in Example 8. The Stormer viscosities and ICI cone and plate viscosities were measured. Additional thickener was added as needed until the paint had a Stormer viscosity of about 95 KU or a little higher. The percent NH3 added was in the form of 28% aqueous solution.

| Example | Thickener Example | % Thickener | Stormer Viscosity | ICI Viscosity | Percent of NH3 added |
|---------|-------------------|-------------|-------------------|---------------|----------------------|
| 12      | 3                 | 9.9         | 115               | 0.6           | 2%                   |
| 13      | 4                 | 3.3         | 95                | 0.6           | 1%                   |
| 14      | 5                 | 6,6         | 134               | 0.7           | 2%                   |
| 15      | 6                 | 5.3         | 127               | 0.6           | 1.5%                 |
| 16      | 7                 | 3.3         | 94                | 0.7           | 0.5%                 |

Thickener Ex. 3 is identical to thickener Ex. 7, except that thickener Ex. 3 was prepared by a conventional latex synthesis approach while Ex. 7 was prepared by a miniemulsion polymerization approach of this invention. Nearly three times as much thickener was needed with the thickener from Ex. 3 to achieve similar paint viscosity. For instance, 6.6% of Example 3 thickener did not give an acceptable Stormer viscosity. Example 3 is clearly an inferior thickener made outside the scope of this invention.

The foregoing examples illustrate the merits of the miniemulsion thickener of this invention but are not intended to be limiting except by the appended claims.

What is claimed is:

1. An aqueous miniemulsion acrylic copolymer thickener for thickening latex paints, the thickener copolymer comprising aqueous copolymerized ethylenically unsaturated monomers on a weight basis:
   between 10% and 90% carboxyl functional monomer;
   between 1% and 50% long alkyl chain ester of acryl or methacrylate where the alkyl chain contains from 11 to 22 carbon atoms;
   between 0% and 90% short chain acrylate or methacrylate selected from methyl acrylate, ethyl acrylate, methyl methacrylate, and ethyl methacrylate;
   with the balance being other ethylenically unsaturated monomers and the total of ethylenically unsaturated monomers copolymerized is 100%;
   where the thickener copolymer is produced by (a) mixing said ethylenically unsaturated monomers in water and surfactant to form an aqueous macroemulsion of liquid monomers, (b) micronizing the aqueous macroemulsion to form a uniform aqueous miniemulsion having an emulsion droplet size less than 5 microns, (c) copolymerizing the ethylenically unsaturated monomers in the absence of solvent to produce a carboxyl functional miniemulsion high molecular weight copolymer having a particle size less than 5 microns, and (d) partially neutralizing the carboxyl functional copolymer with amine to form a thickener copolymer.

2. The copolymer thickener of claim 1 where the emulsion droplet size is less than 1 micron, and the miniemulsion copolymer has a particle size less than 1 micron.

3. The copolymer thickener of claim 1 where the copolymerized ethylenically unsaturated monomers contain between 20% and 90% copolymerized short chain acrylate or methacrylate monomer.

4. The thickener copolymer of claim 1 where between 50% and 100% of the carboxyl functionality on the thickener copolymer is neutralized.

5. The copolymer thickener of claim 1 where up to 5% by weight divinyl monomer is copolymerized with the copolymerized ethylenically unsaturated monomers.

6. The copolymer thickener of claim 5 where between 1 ppm and 1% by weight divinyl monomer is copolymerized.

7. An aqueous miniemulsion acrylic copolymer thickener for thickening aqueous emulsion copolymers of copolymerized ethylenic unsaturated monomers, the thickener copolymer comprising aqueous copolymerized ethylenically unsaturated monomers on a weight basis:

between 10% and 90% carboxyl functional monomer;

between 1 % and 50% long alkyl chain ester of acryl or methacrylate where the alkyl chain contains from 11 to 22 carbon atoms;

between 0% and 90 % short chain acrylate or methacrylate selected from methyl acrylate, ethyl acrylate, methyl methacrylate, and ethyl methacrylate;

with the balance being other ethylenically unsaturated monomers and the total of ethylenically unsaturated monomers copolymerized is 100%;

where the thickener copolymer is produced by (a) mixing said ethylenically unsaturated monomers in water and surfactant to form an aqueous macroemulsion of liquid monomers, (b) micronizing the aqueous macroemulsion to form a uniform aqueous miniemulsion having a emulsion droplet size less than 5 microns, (c) copolymerizing the ethylenically unsaturated monomers to produce a carboxyl functional miniemulsion high molecular weight copolymer having a particle size less than 5 microns, and (d) partially neutralizing the carboxyl functional copolymer with amine to form a thickener copolymer.

8. The copolymer thickener of claim 7 where the emulsion droplet size is less than 1 micron, and the miniemulsion copolymer has a particle size of less than 1 micron.

9. The copolymer thickener of claim 7 where the copolymerized ethylenically unsaturated monomers contain between 20% and 90% copolymerized short chain acrylate or methacrylate monomer.

10. The thickener copolymer of claim 7 where between 50% and 100% of the carboxyl functionality on the thickener copolymer is neutralized.

11. The copolymer thickener of claim 7 where up to 5% by weight divinyl monomer is copolymerized with the copolymerized ethylenically unsaturated monomers.

12. The copolymer thickener of claim 11 where between 1 ppm and 1% by weight divinyl monomer is copolymerized.

* * * * *